United States Patent
Feinman et al.

(10) Patent No.: US 10,572,823 B1
(45) Date of Patent: Feb. 25, 2020

(54) OPTIMIZING A MALWARE DETECTION MODEL USING HYPERPARAMETERS

(71) Applicant: Symantec Corporation, Mountain View, CA (US)

(72) Inventors: Reuben Feinman, Mountain View, CA (US); Aleatha Parker-Wood, Palo Alto, CA (US); Ignacio Bermudez Corrales, Sunnyvale, CA (US); Ryan Curtin, Atlanta, GA (US)

(73) Assignee: CA, Inc., San Jose, CA (US)

( * ) Notice: Subject to any disclaimer, the term of this patent is extended or adjusted under 35 U.S.C. 154(b) by 518 days.

(21) Appl. No.: 15/377,448

(22) Filed: Dec. 13, 2016

(51) Int. Cl.
G06N 20/00 (2019.01)
G06F 21/56 (2013.01)

(52) U.S. Cl.
CPC ............. *G06N 20/00* (2019.01); *G06F 21/56* (2013.01); *G06F 2221/034* (2013.01)

(58) Field of Classification Search
CPC ... G06N 20/00; G06F 21/56; G06F 2221/034; G06F 21/562; G06F 21/564; G06F 21/566
See application file for complete search history.

(56) References Cited

U.S. PATENT DOCUMENTS

| | | | |
|---|---|---|---|
| 9,985,984 B1* | 5/2018 | Chavez | H04L 63/1441 |
| 2017/0132528 A1* | 5/2017 | Aslan | G06N 20/00 |
| 2018/0018555 A1* | 1/2018 | Wong | G06F 7/58 |
| 2018/0096230 A1* | 4/2018 | Luan | G06K 9/6272 |
| 2018/0137406 A1* | 5/2018 | Howard | G06N 3/04 |

OTHER PUBLICATIONS

H. Yang and S. Fong, "Optimized very fast decision tree with balanced classification accuracy and compact tree size," The 3rd International Conference on Data Mining and Intelligent Information Technology Applications, Macao, pp. 57-64 (IEEE 2011) (Year: 2011).*
What are hyperparameters in machine learning?; https://www.quora.com/What-are-hyperparameters-in-machine-learning; as accessed Dec. 14, 2016; Quora; Mar. 25, 2015.
What exactly is a "hyperparameter" in machine learning terminology; https://www.quora.com/What-exactly-is-a-hyperparameter-in-machine-learning-terminology; as accessed Dec. 14, 2016; Quora; Oct. 23, 2015.

(Continued)

*Primary Examiner* — Theodore C Parsons
(74) *Attorney, Agent, or Firm* — FisherBroyles, LLP (57) ABSTRACT

The disclosed computer-implemented method for malware remediation may include constructing a malware detection model by (i) identifying multiple candidate hyperparameter sets, (ii) selecting, from the candidate hyperparameter sets, a set of hyperparameters for the malware detection model that optimizes a tradeoff between model efficacy and model size, and (iii) training the malware detection model on a set of training samples to distinguish between malicious samples and clean samples. After constructing the malware detection model, the disclosed computer-implemented method may also include using the constructed malware detection model to perform a security action. Various other methods, systems, and computer-readable media are also disclosed.

20 Claims, 6 Drawing Sheets

(56) References Cited

OTHER PUBLICATIONS

Cross-validation; http://scikit-learn.org/stable/modules/cross_validation.html; as accessed Dec. 14, 2016; Scikit-learn; Sep. 28, 2016.
L1-based compression of random forest models; https://www.elen.ucl.ac.be/Proceedings/esann/esannpdf/es2012-43.pdf; as accessed Dec. 14, 2016; European Symposium on Artificial Neural Networks; Apr. 25, 2012.
What is the difference between L1 and L2 regularization; https://www.quora.com/What-is-the-difference-between-L1-and-L2-regularization, as accessed Dec. 14, 2016; Quora; Nov. 5, 2013.

* cited by examiner

OPTIMIZING A MALWARE DETECTION MODEL USING HYPERPARAMETERS

BACKGROUND

Many security software providers attempt to combat the growing tide of malicious software with machine learning models trained to detect malware. Conventional malware detection models may be optimized based strictly on efficiency considerations, which tend to result in very large models. Large models may be difficult to ship based on bandwidth restrictions, causing significant delays. Such delays may be especially pronounced for enterprise clients. Additionally, the computation time and cost of malware detection models is often a function of size. As such, smaller models may yield better performance on client machines.

Some malware detection models, such as neural networks, may respond to compression methods that reduce the size of models after the models have been created and trained. However, compression methods may not be available for malware detection models, such as tree-based classifiers, that may lack the weights, vectors, and matrixes exploited in traditional compression methods. Another method may reduce the size of malware detection models, after the model's hyperparameters have been selected, by modifying a model's size-determinant hyperparameters, while holding all other hyperparameters constant. However, modifying size-determinant hyperparameters, while holding constant hyperparameters that do not influence model size, may lead to results that are suboptimal given a model's constraints.

Accordingly, the instant disclosure identifies and addresses a need for improved systems and methods for malware remediation that uses malware detection models that balance preferences for size and efficiency.

SUMMARY

As will be described in greater detail below, the instant disclosure describes various systems and methods for malware remediation. In one example, a computer-implemented method for malware remediation may include constructing a malware detection model by (i) identifying a group of candidate hyperparameter sets, (ii) selecting, from the candidate hyperparameter sets, a set of hyperparameters for the malware detection model that optimizes a tradeoff between model efficacy and model size, and (iii) after selecting the set of hyperparameters for the malware detection model, training the malware detection model on a set of training samples to distinguish between malicious samples and clean samples. In this example, the method may also include using the constructed malware detection model to perform a security action.

In some examples, selecting the set of hyperparameters may include (i) identifying an objective function including a first function that rewards model efficacy and a second function that penalizes model size and (ii) selecting, from among the candidate hyperparameter sets, the set of hyperparameters that optimizes the objective function. In one embodiment, the objective function may also include a weighting term that adjusts the magnitude of at least one of the first function and the second function.

In some examples, selecting the set of hyperparameters that optimizes the objective function may include (i) calculating a value of the objective function for each candidate hyperparameter set, (ii) determining that the selected set of hyperparameters generated the highest value, and (iii) selecting the selected set of hyperparameters based on the determination that the selected set of hyperparameters generated the highest value.

In some examples, calculating the value of the objective function for each candidate hyperparameter set may include (i) creating, for each candidate hyperparameter set within the candidate hyperparameter sets, a potential version of the malware detection model that incorporates the candidate hyperparameter set, (ii) applying, to each potential version of the malware detection model, a series of training samples and testing samples designated for hyperparameter optimization, (iii) obtaining, from each potential version of the malware detection model, a malware classification for each testing sample applied to the potential version of the malware detection model, (iv) calculating, for each potential version of the malware detection model, a classification accuracy of the malware classifications obtained from the potential version of the malware detection model and a size of the potential version of the malware detection model, and (v) calculating the value of the objective function for each candidate hyperparameter set based at least in part on the calculated classification accuracy of the one or more malware classifications obtained from each potential version of the malware detection model, the calculated size of each potential version of the malware detection model, and a value of a weighting term that adjusts the magnitude of at least one of the first function and the second function.

In one embodiment, the security action may include classifying an unknown sample as malicious, blacklisting the unknown sample, sending a malware notification to an administrator of a device infected with the unknown sample, prompting a malware remediation system to perform a remediation action, and/or deploying the malware detection model on an endpoint device.

In examples, the malware detection model may include a decision tree model and/or a random forest model. In one embodiment, the size of the malware detection model may include (i) a depth of trees, (ii) a number of leaves, and/or (iii) a disc size. In one embodiment, the set of training samples may include a group of samples labeled as malicious and a group of samples labeled as clean. In some examples, selecting the set of hyperparameters for the malware detection model may include selecting hyperparameters that influence model size in conjunction with hyperparameters that do not influence model size.

In one embodiment, a system for implementing the above-described method may include a construction module, stored in memory, that constructs a malware detection model using (i) an optimization module, stored in memory, that identifies a group of candidate hyperparameter sets and selects, from the candidate hyperparameter sets, a set of hyperparameters for the malware detection model that optimizes a tradeoff between model efficacy and model size, and (ii) a training module, stored in memory, that trains the malware detection model on a set of training samples to distinguish between malicious samples and clean samples. In this embodiment, the system may also include a security module, stored in memory, that uses the constructed malware detection model to perform a security action, and at least one physical processor configured to execute the construction module, the optimization module, the training module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to construct a malware detection model by (i) identifying a group of candidate hyperparameter sets, (ii) selecting, from the candidate hyperparameter sets, a set of hyperparameters for the malware detection model that optimizes a tradeoff between model efficacy and model size, and (iii) training the malware detection model on a set of training samples to distinguish between malicious samples and clean samples. In these examples, the computer-executable instructions may also cause the computing device to use the constructed malware detection model to perform a security action.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for malware remediation. As will be explained in greater detail below, the disclosed systems and methods describe a hyperparameter optimization framework that takes model size into consideration during parameter evaluation and ranking, using an objective metric for hyperparameter optimization that includes a penalty term as a function of model size.

By selecting the hyperparameters for malware detection models based on a tradeoff between size and efficacy, the systems and methods described herein may be able to (i) improve the deployability of malware detection models and (ii) improve the classification accuracy of malware detection models, thereby reducing the number of resulting false positives and/or false negatives, when compared to traditional malware detection models created with hyperparameters optimized for efficacy only and altered posterior to hyperparameter optimization to account for size.

In addition, the systems and methods described herein may improve the functioning of a computing device by providing a malware detection model that requires fewer of the computing device's resources and/or more accurately detects and remediates malware threats. These systems and methods may also improve the field of enterprise-level security by providing a malware detection model that is relatively easier to deploy due to its small size.

Figure 1:
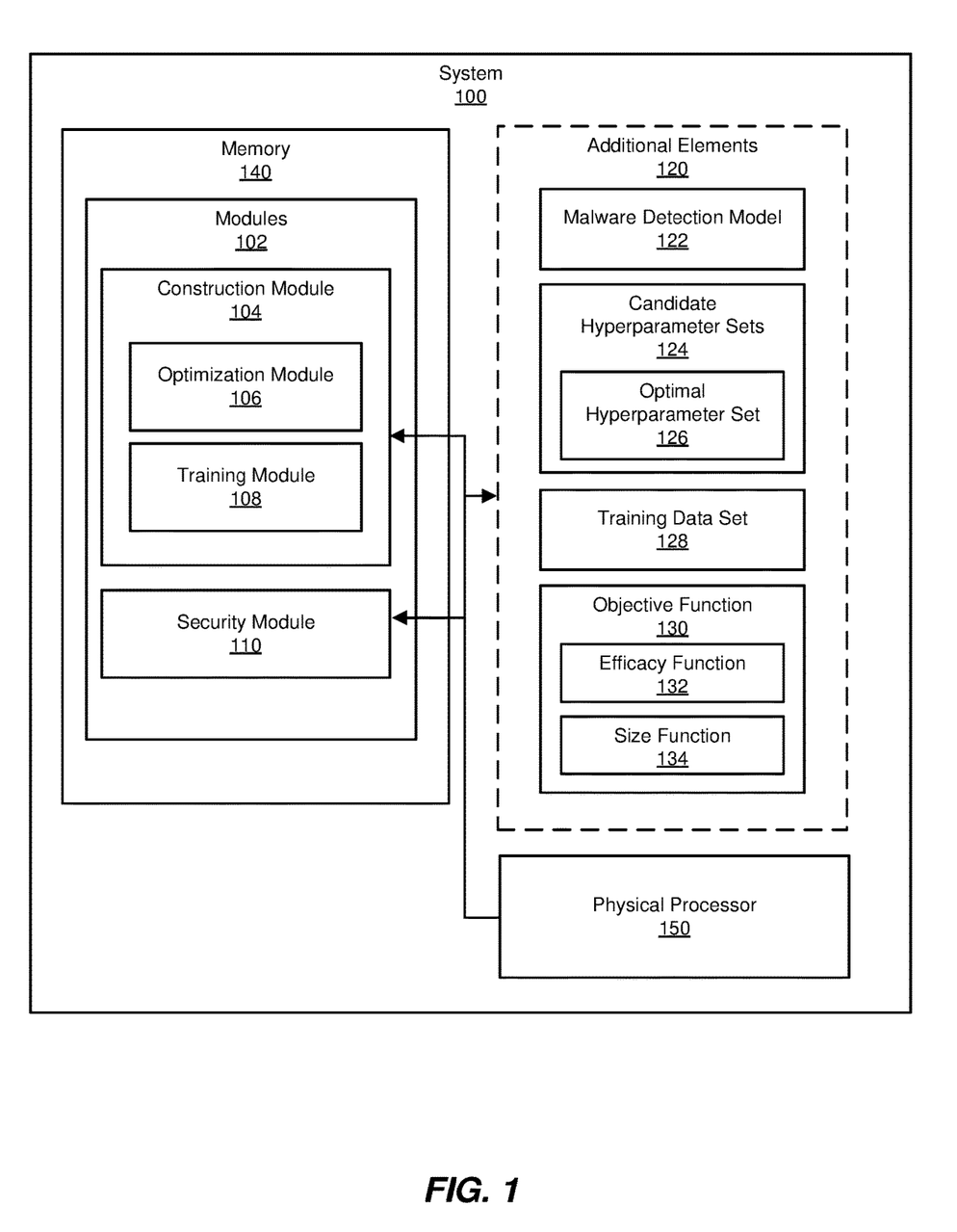
FIG. 1 is a block diagram of an example system for malware remediation.
Figure 2:
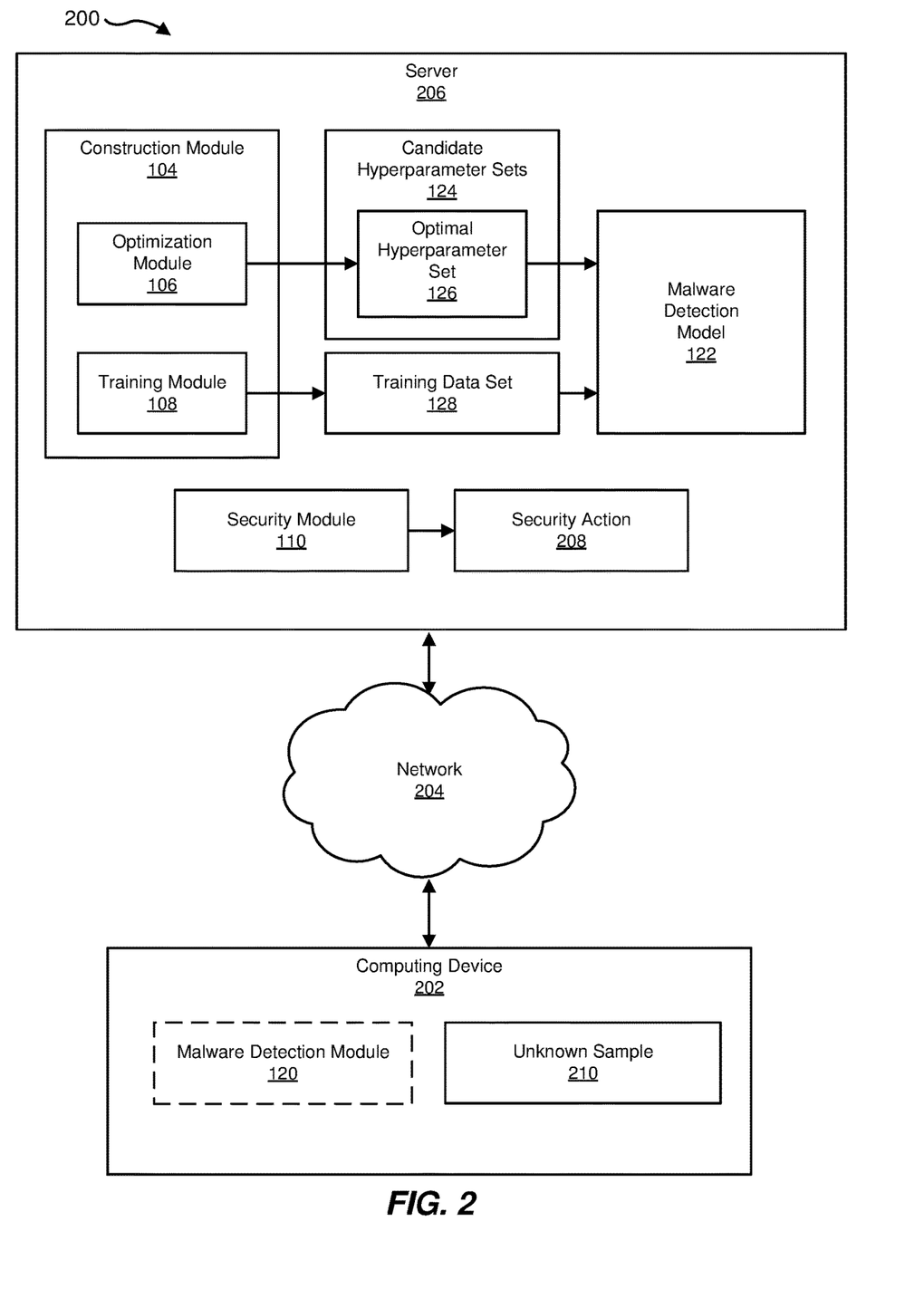
FIG. 2 is a block diagram of an additional example system for malware remediation.

The following will provide, with reference to FIGS. 1-2, detailed descriptions of example systems for malware remediation. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for malware remediation. As illustrated in this figure, exemplary system 100 may include one or more modules 102 for performing one or more tasks. For example, and as will be explained in greater detail below, exemplary system 100 may include a construction module 104 that constructs a malware detection model. In some examples, construction module 104 may construct the malware detection model using (i) an optimization module 106 that identifies a group of candidate hyperparameter sets and selects, from the group of candidate hyperparameter sets, a set of hyperparameters that optimizes a tradeoff between model efficacy and model size, and (ii) a training module 108 that trains the malware detection model on a set of training samples to distinguish between malicious samples and clean samples. Exemplary system 100 may also include a security module 110 that uses the constructed malware detection model to perform a security action. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 150. Physical processor 150 generally represents any type or form of hardware-implemented processing unit capable of interpreting and/or executing computer-readable instructions. In one example, physical processor 150 may access and/or modify one or more of modules 102 stored in memory 140. Additionally or alternatively, physical processor 150 may execute one or more of modules 102 to facilitate malware remediation. Examples of physical processor 150 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120. Additional elements 120 may include a malware detection model 122, a group of candidate hyperparameter sets 124 that includes an optimal hyperparameter set 126, a training data set 128, and an objective function 130 that includes an efficacy function 132 and a size function 134.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

As will be described in greater detail below, one or more of modules 102 from FIG. 1 may, when executed by at least one processor of computing device 202 and/or server 206, enable computing device 202 and/or server 206 to remediate malware. For example, and as will be described in greater detail below, construction module 104 may construct malware detection model 122 using optimization module 106 to perform hyperparameter optimization and training module 108 to perform machine learning training. In this example, optimization module 106 may select optimal hyperparameters for malware detection model 122 by (i) identifying the group of candidate hyperparameter sets 124 and (ii) selecting, from the group of candidate hyperparameter sets 124, optimal hyperparameter set 126 that optimizes a tradeoff between model efficacy and model size. Then, training module 108 may train malware detection model 122 on training data set 128 to distinguish between malicious samples and clean samples. After construction module 104 constructs malware detection model 122, security module 110 may use malware detection model 122 to perform a security action 208.

Computing device 202 generally represents any type or form of computing device capable of reading computer-executable instructions. For example, computing device 202 may represent an endpoint device running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of remediating malware. For example, server 206 may represent a security server that constructs malware detection models and uses the constructed malware detection models to improve the security of one or more devices. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
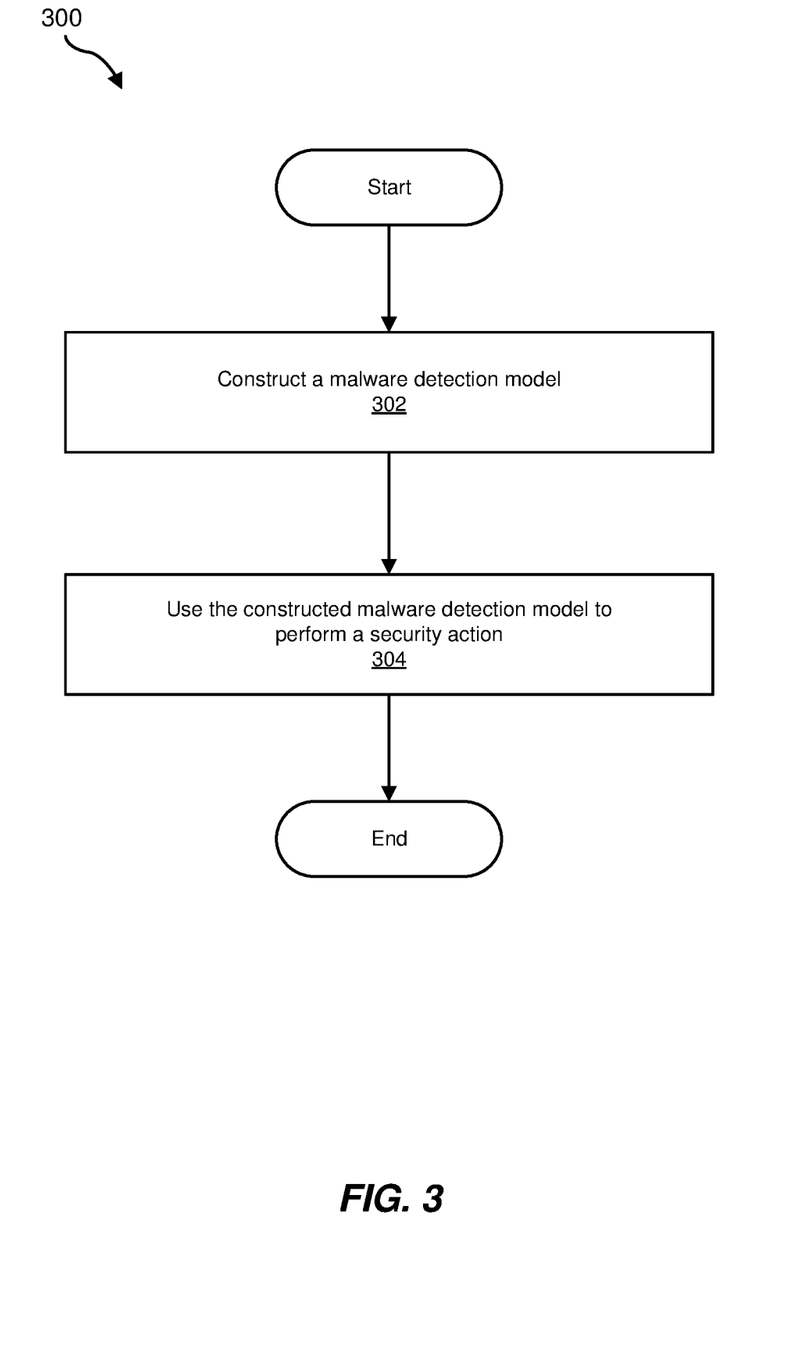
FIG. 3 is a flow diagram of an example method for malware remediation.

FIG. 3 is a flow diagram of an example computer-implemented method 300 for malware remediation. FIG. 3 is used herein in connection with FIG. 4, which is a flow diagram of an example computer-implemented method 400 for constructing malware detection models. The steps shown in FIGS. 3-4 may be performed by any suitable computer-executable code and/or computing system, including system 100 in FIG. 1, system 200 in FIG. 2, and/or variations or combinations of one or more of the same. In one example, each of the steps shown in FIGS. 3-4 may represent an algorithm whose structure includes and/or is represented by multiple sub-steps, examples of which will be provided in greater detail below.

As illustrated in FIG. 3, at step 302, one or more of the systems described herein may construct a malware detection model. For example, construction module 104 may, as part of server 206 in FIG. 2, construct malware detection model 122.

As used herein, the term "malware detection model" generally refers to any type or form of data structure capable of modeling a set of inputs to classify, label, categorize, rate, score, and/or extract one or more features from one or more future inputs. Malware detection model 122 may represent a variety of model types, including, without limitation, a decision tree model, a random forest model, a linear classifier, and/or a neural network. In some examples, malware detection model 122 may include (i) a set of parameters that malware detection model 122 learns from labeled sample data during a training process and (ii) a set of hyperparameters that may not be learned and that are fixed prior to the training process.

The term "parameter," as used herein, generally refers to any type or form of model property whose values are learned by a malware detection model through a machine learning process. In some examples, a parameter may represent a quantity that amplifies or dampens inputs, such as a weight and/or a coefficient.

The term "hyperparameter," as used herein, generally refers to any type or form of higher-level model property, such as complexity or capacity to learn, that may not be directly learned from the regular training process. Examples of hyperparameters may include, without limitation, a number of leaves and/or depth (e.g., in a decision making tree), a number of trees (e.g., in a random forest), a number of hidden layers and/or a number of nodes within a hidden layer (e.g., in a neural network), etc.

In some examples, construction module 104 may construct malware detection model 122 in two phases, using optimization module 106, during the first phase, to perform hyperparameter optimization for malware detection model 122 and using training module 108, during the second phase, to train malware detection model 122.

As used herein, the term "hyperparameter optimization" generally refers to any type or form of process and/or protocol for choosing a set of hyperparameters for a malware detection model. Traditional hyperparameter optimization selects hyperparameters for new models that optimize model efficacy, without optimizing model size during the hyperparameter optimization. In contrast, the disclosed systems and methods provide a hyperparameter optimization process that optimizes the tradeoff between (i) the efficacy of a new model and (ii) the size of the malware detection model, as will be described in greater detail below.

Figure 4:
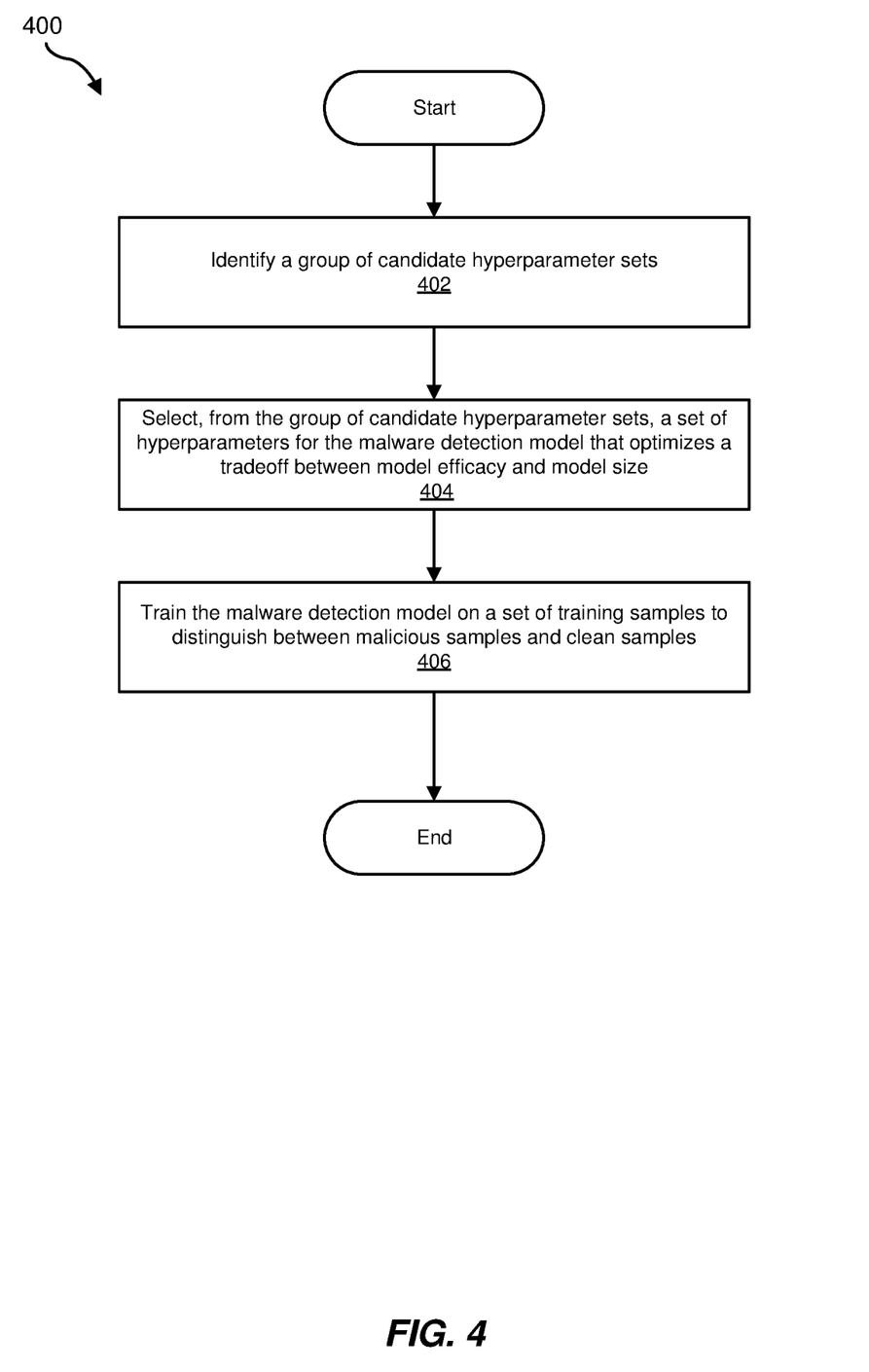
FIG. 4 is a flow diagram of an example method for constructing a malware detection model for malware remediation.

Optimization module 106 may select the hyperparameters to be included in malware detection model 122 in a variety of ways. First, as illustrated in FIG. 4 at step 402, optimization module 106 may identify a group of candidate hyperparameter sets. For example, optimization module 106 may identify candidate hyperparameter sets 124.

As used herein, the term "candidate hyperparameter set" generally refers to a collection of hyperparameters to be evaluated, working in concert as a set, for inclusion in malware detection model 122. Optimization module 106 may identify candidate hyperparameter sets 124 in a variety of ways. In some embodiments, optimization module 106 may identify candidate hyperparameter sets 124 by performing a grid search of a predetermined grid of candidate hyperparameter sets and/or a random subset of the predetermined grid of candidate hyperparameter sets. Additionally or alternatively, optimization module 106 may identify a collection of individual candidate hyperparameters and iteratively create candidate hyperparameter sets 124 by combining different subsets of the collection of individual candidate hyperparameters using Bayesian optimization techniques. In one embodiment, optimization module 106 may determine which candidate hyperparameters to include in the various candidate hyperparameter sets using an intelligent probability-based inference model.

Next, at step 404 in FIG. 4, optimization module 106 may select, from the group of candidate hyperparameter sets, a set of hyperparameters for the malware detection model that optimizes a tradeoff between model efficacy and model size. For example, optimization module 106 may select, from candidate hyperparameter sets 124, optimal hyperparameter set 126.

As used herein, the term "model efficacy" generally refers to any type or form of measurement describing a model's ability to produce the model's intended result. In some examples, the term "model efficacy" may refer to a measurement describing a model's classification accuracy. The term "model size," as used herein, generally refers to any type or form of measurement describing the size of a model. Examples of such measurements may include, without limitation, a disc size of a model, a depth of trees, and/or a number of leaves.

Optimization module 106 may select optimal hyperparameter set 126 in a variety of ways. In some examples, optimization module 106 may select, from candidate hyperparameter sets 124, the set of hyperparameters that optimize objective function 130 (i.e., optimal hyperparameter set 126). In these examples, objective function 130 may include a first function (i.e., efficacy function 132) that rewards model efficacy and a second function (i.e., size function 134) that penalizes model size.

In some embodiments, objective function 130 may also include a weighting term that adjusts the magnitude of size function 134. Additionally or alternatively, objective function 130 may include a weighting term that adjusts the magnitude of efficacy function 132. In these embodiments, the weighting term may balance the importance of size and efficacy according to a predefined preference. In one example, this preference may represent a user-defined preference. In some examples, the disclosed systems and methods may normalize efficacy function 132 and size function 134 to have the same domain such that the weighting term behaves as a simple ratio.

Optimization module 106 may identify the set of hyperparameters that optimizes objective function 130 in a variety of ways. In one example, optimization module 106 may calculate a value of objective function 130 for each candidate hyperparameter set within candidate hyperparameter sets 124. In this example, optimization module 106 may determine that optimal hyperparameter set 126 generated the highest value, relative to the values generated by the other candidate hyperparameter sets within candidate hyperparameter sets 124, and select optimal hyperparameter set 126 based on the determination.

Optimization module 106 may calculate the value of objective function 130 for each candidate hyperparameter set in various ways. For example, optimization module 106 may calculate the value of objective function 130 for each candidate hyperparameter set based on how each candidate hyperparameter set performs in a testing environment.

In one such example, optimization module 106 may create, for each candidate hyperparameter set, a potential version of malware detection model 122 that incorporates the candidate hyperparameter set. Then, optimization module 106 may apply a series of training samples and testing samples (e.g., samples designated for hyperparameter optimization) to each of the potential versions of malware detection model 122.

In some examples, optimization module 106 may apply the series of training samples and testing samples to the potential versions of malware detection model 122 using cross-validation. In these examples, optimization module 106 may divide the training samples into a predetermined number of training sets and divide the testing samples into the same number of test sets. Then, optimization module 106 may apply a training set, followed by a testing set, to each of the potential versions of malware detection model 122 the predetermined number of times.

After applying the testing samples to each of the potential versions of malware detection model 122, optimization module 106 may obtain, from each of the potential versions of malware detection model 122, a malware classification for each testing sample to evaluate each version's performance. Based on the performance of each potential version of malware detection model 122, optimization module 106 may calculate a classification accuracy for each potential version of malware detection model 122.

In examples in which optimization module 106 uses cross-validation techniques, optimization module 106 may calculate a classification accuracy for each potential version of malware detection model 122 by measuring an average performance of each potential version of malware detection model 122. In addition to calculating a classification accuracy for each potential version of malware detection model 122, optimization module 106 may also calculate a size of each potential version of the malware detection model.

After calculating a classification accuracy and model size for each potential version of malware detection model 122, optimization module 106 may calculate the value of objective function 130 for each candidate hyperparameter set based at least in part on (i) the calculated classification accuracies, (ii) the calculated sizes, and (iii) a value of a weighting term that adjusts the magnitude of at least one of the efficacy function 132 and size function 134.

After optimization module 106 selects an optimal hyperparameter set, training module 108 may train a malware detection model (i.e., a malware detection model that includes the optimal hyperparameter set) to distinguish between malicious samples and clean samples, as illustrated at step 406 in FIG. 4. For example, training module 108 may train malware detection model 122 on training data set 128. Training module 108 may train malware detection model 122 using any type of machine learning technique. In some examples, training module 108 may train malware detection model 122 by applying a series of malicious samples labeled as malicious and clean samples labeled as clean to malware detection model 122. In some such examples, malware detection model 122 may learn, from the labeled samples, one or more parameters to be incorporated into malware detection model 122.

Returning to FIG. 3, at step 304, one or more of the systems described herein may use the constructed malware detection model to perform a security action. For example, security module 110 may, as part of computing device 202 and/or server 206 in FIG. 2, use malware detection model 122 to perform security action 208.

Security action 208 may include any of a variety of security actions. In some examples, security action 208 may include classifying an unknown sample (such as unknown sample 210) as malicious. In some such examples, security module 110 may (e.g., in response to malware detection model 122 classifying unknown sample 210 as malicious) perform one or more additional security actions. Additionally or alternatively, security module 110 may cause and/or trigger the additional security action to be performed.

Examples of additional security actions, performed in response to malware detection model 122 classifying unknown sample 210 as malicious, may include, without limitation, removing unknown sample 210, quarantining unknown sample 210, sandboxing unknown sample 210 and/or a process associated with unknown sample 210, blocking the execution of unknown sample 210, terminating a process associated with unknown sample 210, blocking a network connection associated with unknown sample 210, performing a security scan, deploying a security barrier (e.g., adding a firewall restriction, deploying an authentication requirement, etc.), blacklisting unknown sample 210, and/or sending a malware notification to a user (e.g., an administrator of a device infected with unknown sample 210).

In some examples, security action 208 may include deploying malware detection model 122 to an endpoint device, such as computing device 202. In these examples, unknown sample 210 may represent a sample identified on computing device 202. In one example, the disclosed systems and methods may incorporate malware detection model 122 into a malware remediation system. In this example, security module 110 may deploy malware detection model 122 to computing device 202 by deploying the malware remediation system. In some examples, the malware remediation system may also include a remediation module that performs a security action (such as the additional security actions described above) in response to malware detection model 122 classifying a sample identified on computing device 202 as malicious.

As described above, the disclosed systems and methods provide an improved heuristic model to be used in malware remediation. In traditional model construction techniques, model size may be controlled before hyperparameter optimization begins (e.g., by providing an optimizer with a model size limit) or after hyperparameter optimization completes (e.g., by manipulating size determining hyperparameters selected during the hyperparameter optimization). The disclosed systems and methods, by contrast, disclose an objective function for hyperparameter optimization that takes both efficacy and size into account, according to a predetermined preference ratio. By selecting hyperparameters during hyperparameter optimization that optimize a tradeoff between model efficacy and model size, hyperparameters that influence model size may be selected in conjunction with hyperparameters that do not influence model size.

In some examples, the disclosed systems and methods build a classification model by (i) selecting (e.g., tuning) optimal hyperparameters to be used during training and (ii) using the selected optimal hyperparameters to train the classification model. Selecting the hyperparameter may involve several steps. First, a group of candidate parameter sets and an objective function, to be used to evaluate the candidate parameter sets, may be provided. Then, a value of the objective function is recorded for each candidate parameter set, which may be used to rank each of the candidate parameter sets.

The disclosed objective function represents a new objective function for malware heuristic tuning that takes model size into consideration and that weights the importance of model size according to user preferences. In some examples, the disclosed objective function includes a first function that describes efficacy, a second function that describes model size, and a weighting term to describe case-specific preferences about the weighting between the first function and the second function. Specific examples of the second function may include, in examples in which the classification model represents a forest model, a maximum depth of trees in the model, a number of leaves in the model, and/or a total disc size of the model. In some examples, the disclosed systems and methods may improve the ability of a user (e.g., a developer) to customize a classification model by allowing the user to select (i) a measure of size for the second function and (ii) a balance between the first function and the second function. In some examples, the first function and the second function may be normalized so that the weighting term may be interpretable across different selections of the first function and the second function. In these examples, the weighting term may operate as a simple ratio.

Figure 5:
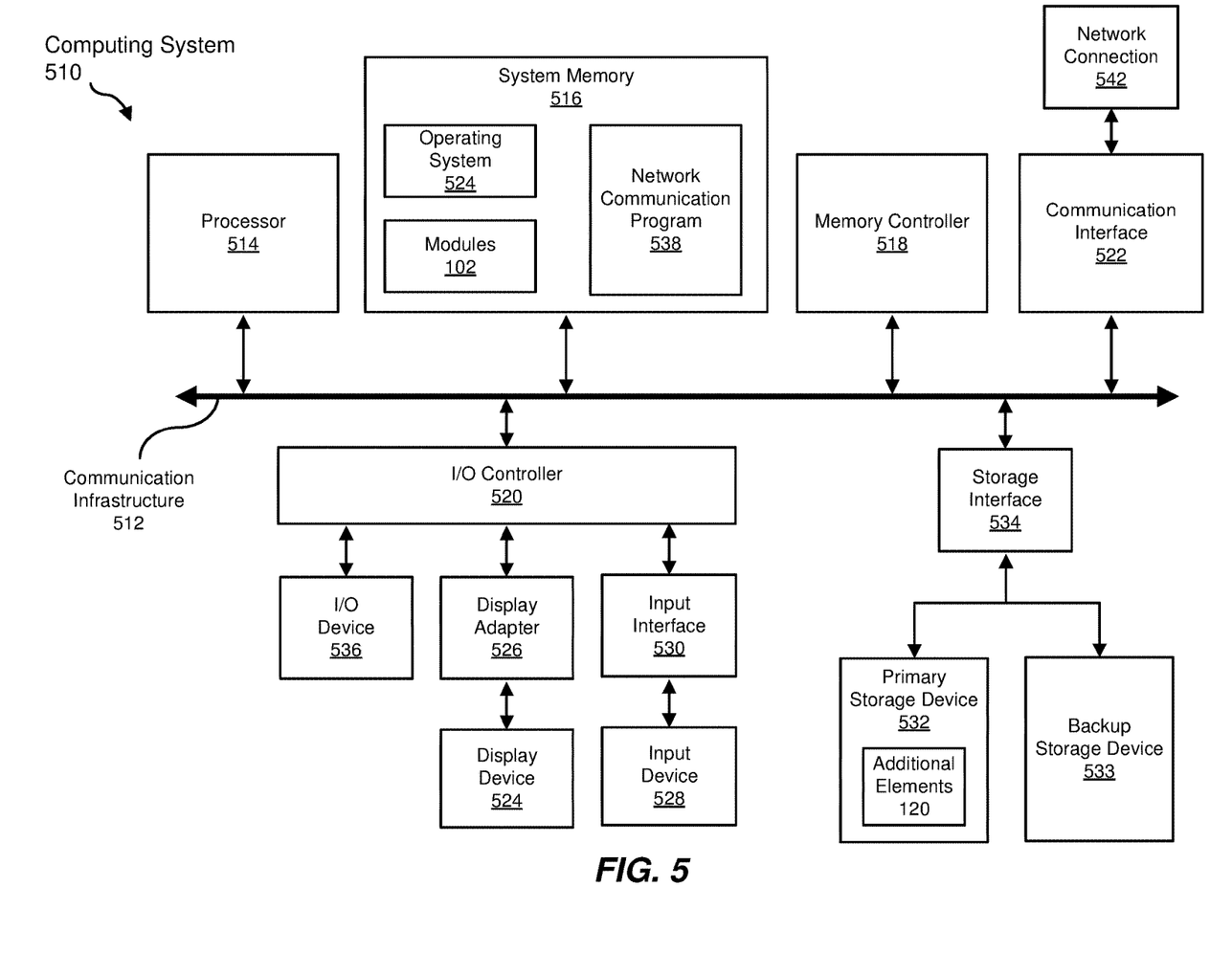
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, additional elements 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
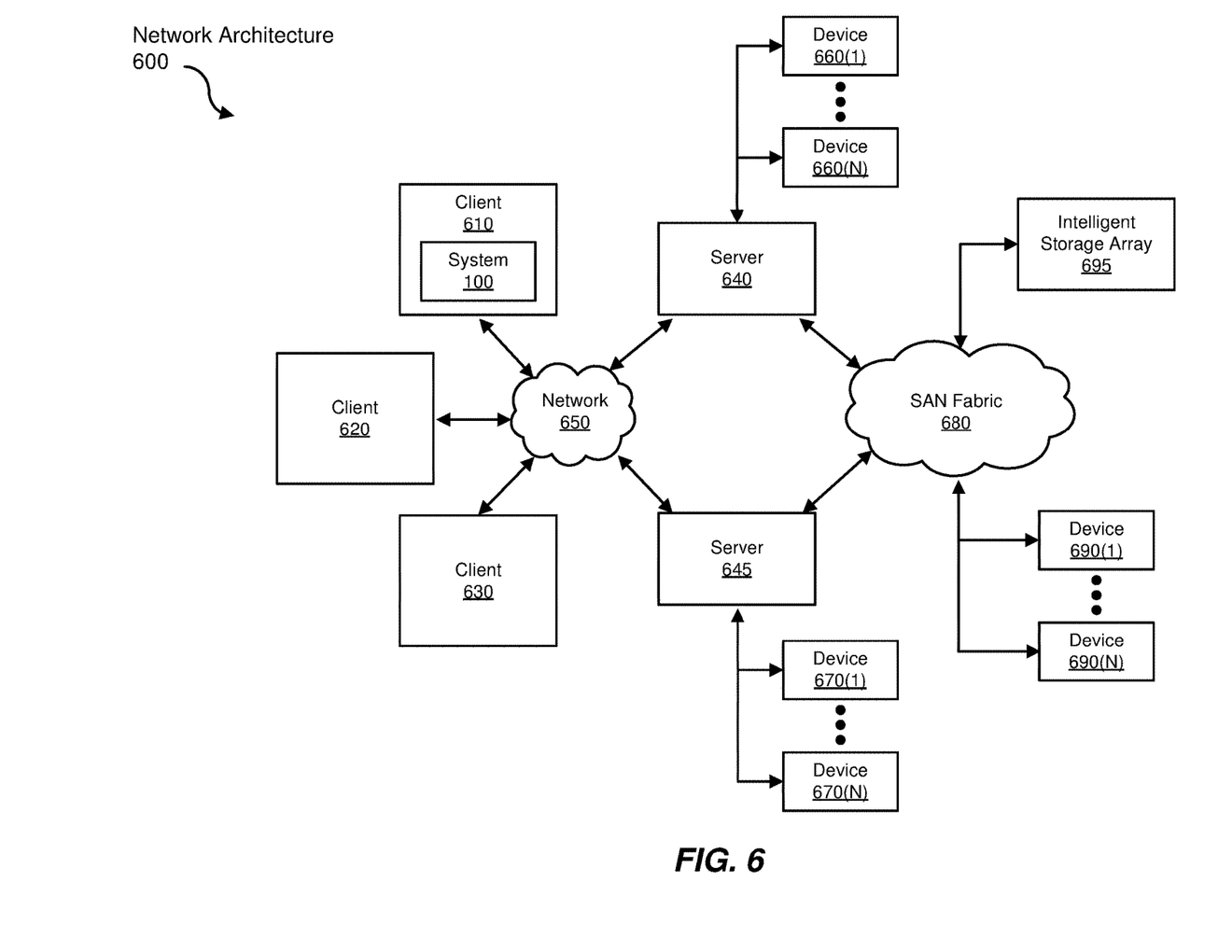
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for malware remediation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a sample of potential malware to be transformed, transform the sample, output a result of the transformation to classify the sample of potential malware, use the result of the transformation to train a machine learning classifier and/or to determine the certainty with which the machine learning classifier classifies the sample, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for malware remediation, at least a portion of the method being performed by a computing device comprising at least one processor, the method comprising:
   constructing a tree-based malware detection model by:
      identifying an objective function comprising a first function that rewards model efficacy and a second function that penalizes model size;
      calculating a value of the objective function for each candidate hyperparameter set within a group of candidate hyperparameter sets and selecting, from among the group of candidate hyperparameter sets, a set of hyperparameters for the malware detection model that generated the highest value for the objective function; and
      after selecting the set of hyperparameters for the malware detection model, training the malware detection model on a set of training samples to distinguish between malicious samples and clean samples; and
   using the constructed malware detection model to perform a security action.

2. The computer-implemented method of claim 1, further comprising, prior to calculating a value of the objective function for each candidate hyperparameter set within the group of candidate hyperparameter sets, identifying the group of candidate hyperparameter sets by at least one of:
   performing a grid search of at least one of a predetermined grid of candidate hyperparameter sets and a random subset of the predetermined grid of candidate hyperparameter sets; and
   identifying a collection of individual candidate hyperparameters and iteratively creating each candidate hyperparameter set by combining different subsets of the collection of individual candidate hyperparameters using Bayesian optimization.

3. The computer-implemented method of claim 1, wherein the objective function comprises a weighting term that adjusts the magnitude of at least one of the first function and the second function.

4. The computer-implemented method of claim 3, further comprising creating the objective function, wherein creating the objective function comprises normalizing the first function and the second function to have a same domain.

5. The computer-implemented method of claim 1, wherein calculating the value of the objective function for each candidate hyperparameter set comprises:
creating, for each candidate hyperparameter set within the group of candidate hyperparameter sets, a potential version of the malware detection model that incorporates the candidate hyperparameter set;
applying, to each potential version of the malware detection model, a series of training samples and testing samples designated for hyperparameter optimization;
obtaining, from each potential version of the malware detection model, a malware classification for each testing sample applied to the potential version of the malware detection model;
calculating, for each potential version of the malware detection model:
 a classification accuracy of the malware classifications obtained from the potential version of the malware detection model; and
 a size of the potential version of the malware detection model; and
calculating the value of the objective function for each candidate hyperparameter set based at least in part on:
 the calculated classification accuracy of the one or more malware classifications obtained from each potential version of the malware detection model;
 the calculated size of each potential version of the malware detection model; and
 a value of a weighting term that adjusts the magnitude of at least one of the first function and the second function.

6. The computer-implemented method of claim 1, wherein the security action comprises at least one of:
classifying an unknown sample as malicious;
blacklisting the unknown sample;
sending a malware notification to an administrator of a device infected with the unknown sample;
prompting a malware remediation system to perform a remediation action; and
deploying the malware detection model on an endpoint device.

7. The computer-implemented method of claim 1, wherein the malware detection model comprises at least one of:
a decision tree model; and
a random forest model.

8. The computer-implemented method of claim 1, wherein the size of the malware detection model comprises at least one of:
a depth of trees;
a number of leaves; and
a disc size.

9. The computer-implemented method of claim 1, wherein the set of training samples comprises:
a plurality of samples labeled as malicious; and
a plurality of samples labeled as clean.

10. The computer-implemented method of claim 1, wherein selecting the set of hyperparameters for the malware detection model comprises selecting hyperparameters that influence model size in conjunction with hyperparameters that do not influence model size.

11. A system for malware remediation, the system comprising:
a construction module, stored in memory, that constructs a tree-based malware detection model using:
 an optimization module, stored in memory, that:
  identifies an objective function comprising a first function that rewards model efficacy and a second function that penalizes model size;
  calculates a value of the objective function for each candidate hyperparameter set within a group of candidate hyperparameter sets; and
  selects, from the group of candidate hyperparameter sets, a set of hyperparameters for the malware detection model that generated the highest value for the objective function; and
 a training module, stored in memory, that, after the optimization module has selected the set of hyperparameters for the malware detection model, trains the malware detection model on a set of training samples to distinguish between malicious samples and clean samples;
a security module, stored in memory, that uses the constructed malware detection model to perform a security action; and
at least one physical processor configured to execute the construction module, the optimization module, the training module, and the security module.

12. The system of claim 11, wherein the optimization module, prior to calculating a value of the objective function for each candidate hyperparameter set within the group of candidate hyperparameter sets, identifies the group of candidate hyperparameter sets by at least one of:
performing a grid search of at least one of a predetermined grid of candidate hyperparameter sets and a random subset of the predetermined grid of candidate hyperparameter sets; and
identifying a collection of individual candidate hyperparameters and iteratively creating each candidate hyperparameter set by combining different subsets of the collection of individual candidate hyperparameters using Bayesian optimization.

13. The system of claim 12, wherein the objective function comprises a weighting term that adjusts the magnitude of at least one of the first function and the second function.

14. The system of claim 12, wherein the optimization module further creates the objective function, wherein creating the objective function comprises normalizing the first function and the second function to have a same domain.

15. The system of claim 11, wherein the optimization module calculates the value of the objective function for each candidate hyperparameter set by:
creating, for each candidate hyperparameter set within the group of candidate hyperparameter sets, a potential version of the malware detection model that incorporates the candidate hyperparameter set;
applying, to each potential version of the malware detection model, a series of training samples and testing samples designated for hyperparameter optimization;
obtaining, from each potential version of the malware detection model, a malware classification for each testing sample applied to the potential version of the malware detection model;
calculating, for each potential version of the malware detection model:
 a classification accuracy of the malware classifications obtained from the potential version of the malware detection model; and
 a size of the potential version of the malware detection model; and
calculating the value of the objective function for each candidate hyperparameter set based at least in part on:

the calculated classification accuracy of the one or more malware classifications obtained from each potential version of the malware detection model;

the calculated size of each potential version of the malware detection model; and a value of a weighting term that adjusts the magnitude of at least one of the first function and the second function.

16. The system of claim 11, wherein the security action comprises at least one of:

classifying an unknown sample as malicious;

blacklisting the unknown sample;

sending a malware notification to an administrator of a device infected with the unknown sample;

prompting a malware remediation system to perform a remediation action; and deploying the malware detection model on an endpoint device.

17. The system of claim 11, wherein the malware detection model comprises at least one of:

a decision tree model; and a random forest model.

18. The system of claim 11, wherein the size of the malware detection model comprises at least one of:

a depth of trees;

a number of leaves; and a disc size.

19. The system of claim 11, wherein the set of training samples comprises:

a plurality of samples labeled as malicious; and a plurality of samples labeled as clean.

20. A non-transitory computer-readable medium comprising one or more computer-readable instructions that, when executed by at least one processor of a computing device, cause the computing device to:

construct a tree-based malware detection model by:

identifying an objective function comprising a first function that rewards model efficacy and a second function that penalizes model size;

calculating a value of the objective function for each candidate hyperparameter set within a group of candidate hyperparameter sets and selecting, from among the group of candidate hyperparameter sets, a set of hyperparameters for the malware detection model that generated the highest value for the objective function; and after selecting the set of hyperparameters for the malware detection model, training the malware detection model on a set of training samples to distinguish between malicious samples and clean samples; and use the constructed malware detection model to perform a security action.

* * * * *